Sept. 28, 1965  G. M. BROWN  3,208,115
INVESTMENT MOLDING

Filed May 24, 1962  2 Sheets-Sheet 1

INVENTOR.
GEORGE M. BROWN
BY John N. Gallagher
HIS ATTORNEY

United States Patent Office 3,208,115
Patented Sept. 28, 1965

3,208,115
INVESTMENT MOLDING
George M. Brown, 7536 Johnnycake Ridge Road,
Mentor Township, Lake County, Ohio
Filed May 24, 1962, Ser. No. 197,392
6 Claims. (Cl. 22—193)

This invention relates to investment molding and more particularly concerns the investment of molds and cores with a slurry of highly comminuted refractory mix to obtain high dimensional accuracies in large precision castings.

Considerable difficulty has been experienced in prior art efforts to obtain high dimensional accuracies in large precision castings, not only with respect to overall dimensions but also as to wall thickness, smooth finishes on interior and exterior surfaces, detail definition and general repeatability.

Shell molding techniques have made only a limited contribution toward solution of the above noted difficulties. Although sand shell molds and cores are highly stable after curing, unpredictable warping effects during curing have resulted in poor repeatability and are generally responsible for the inability to obtain consistently high dimensional accuracies. In addition, the detail definition attainable by sand shell molds and cores, although improved over most prior art techniques, falls far short of that which can be achieved by investment and plaster casting methods.

Plaster molding techniques attain excellent dimensional accuracies and repeatability. These processes, however, do not readily lend themselves to precision castings of the larger type due to the weight of the molding and coring materials needed as well as the special mold and core processing equipment required.

Considering molding techniques presently utilized for complex casting configurations, disposable pattern processes featuring frozen mercury, wax, white metal alloy, and polystyrene patterns have been in use for several years. As a group, however, these disposable pattern techniques have met with only limited success when applied to large precision castings principally due to unpredictable shrinkage effects during solidification. Further dimensional variations take place as a result of warping of molds during storage due to their own weight as well as due to natural physical aging processes. Efforts to overcome these dimensional stability problems have proven time consuming and costly.

One of the objects of the present invention is to overcome these and many other problems known to the prior art by a new and improved investment molding process by which molds and cores of high dimensional accuracy and stability can repeatedly be obtained.

Another object of this invention is to provide a new and improved investment molding process for obtaining investment-type smooth finishes on interior and exterior surfaces of large precision castings.

A further object of this invention is to provide a new and improved investment molding process which eliminates the need for large disposable patterns when molding or coring for large castings requiring investment-type smooth finishes on interior and exterior surfaces.

An additional object of this invention is to provide a new and improved investment molding process that incorporates all the advantages of conventional investment and plaster molding but avoids such limitations as reduced permeability and lessened accuracy with increase in size.

Still another object of this invention is to provide a new and improved investment molding process which provides for highly accurate and repeatable wall thicknesses on large precision castings.

A still further object of this invention is to provide a new and improved investment molding process which permits greater casting detail to be defined by the mold and core than heretofore possible.

Other objects and advantages of the present invention will become apparent from consideration of the following specification, taken in conjunction with the accompanying drawings, in which like designators refer to the same of similar parts throughout, and in which.

In accordance with conventional sand shell mold forming practice, a heated metal pattern is placed in a dump box containing a mixture of sand and a thermosetting resin. Operation of the dump box repeatedly throws the mixture onto the heated pattern. When sufficient thickness is built-up to form a self-supporting shell structure, the pattern with its sand shell is then normally placed in an oven to complete the curing process, after which the sand shell is stripped from the pattern in sections. The mold sections are then reassembled and secured as by a bonding agent. Often the assembled sand shell mold is backed up with steel shot or sand prior to the casting operation. Where a core is required, the sand and resin mixture is dropped or blown into a heated metal core box forming this self-supporting shell of resin bonded sand adhering to the interior surfaces of the core box. After a short time the box is inverted to dispose of the excess mixture. The core box is then opened and the core, which has been completely cured in place, is removed and assembled with the mold prior to the casting operation.

In accordance with conventional investment molding practice, the pattern to be invested is placed in a flask into which is poured a self-bonding ceramic slurry containing solids such as silica sand and flour, grog and sillimanite, as well as a bonding agent such as silicate, sodium silicate and water, aqueous colloidal silica, or plaster of Paris and water. When the mold has set it is carefully dried out and the pattern withdrawn. Where integral removal of the pattern is not possible, it is normally formed of a disposable material, such as wax. After setting of the investment, the mold is conventionally heated in warm arm to about 220 degrees F., whereupon the wax runs out. The mold is then fired, its temperature being ultimately raised to about 2000 degrees F. and maintained there until the residual carbon is removed. The mold is then ready to receive the molten casting metal.

In accordance with the present invention, a porous resin-bonded sand premold, such as an undersize core or an oversize mold, is associated with a finish or true-size die so as to define a cavity therebetween. A slurry of self-bonding refractory mix is poured, injected or otherwise disposed in the cavity so as to form a layer of investment which adheres to the porous sand premold. One or more loose pieces or patterns, of either a permanent or a disposable material, may be positioned in the cavity and invested along with the premold. These patterns may be either integrally removable, or may be melted out by a low temperature disposal process. The invested premold is then dried at a temperature below the destruction temperature of the sand premold. As final preparation of the invested premold prior to casting, provision may be made for the application of vacuum to the mold assembly.

Figure 1:
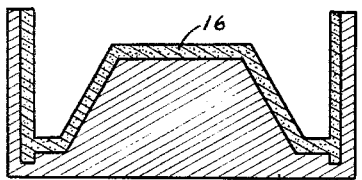
FIG. 1 is a schematic view showing in simplified sectional form an oversize shell mold being formed by a preform mold box.
Figure 2:
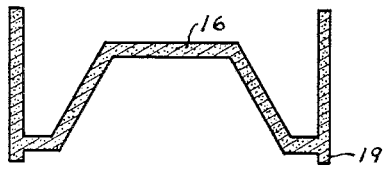
FIG. 2 is a schematic view showing is simplified sectional form an oversize shell mold.
Figure 3:
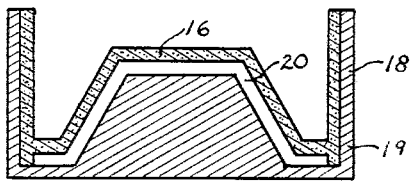
FIG. 3 is a schematic view showing in simplified sectional form the upper oversize mold section associated with its finish mold die so as to define an investment cavity therebetween.

Referring now more particularly to the drawings, FIG. 1 shows a sand shell mold 16 conventionally formed as described above, but in an oversize configuration by means of preform mold box 17. The oversize shell mold 16, shown in FIG. 2, is placed in a finish plastic or metal mold die 18, illustrated in FIG. 3, being supported in spaced relation to the formative surfaces of the die by projecting portions 19 so as to define a cavity 20 therebetween. Using conventional investment molding techniques, a slurry of highly comminuted self-bonding refractory mix is then poured or otherwise disposed between the oversize shell mold and the finish die so as to form a layer of investment 22 adhering to the interior surface of the shell mold section. The finish die arrangement should be such that core prints, and surfaces of each mold section which are to be contiguous upon assembly, also be invested with the slurry as shown at 23, in FIG. 4. The invested shell mold sections may either be stored or subjected to a drying operation immediately prior to mold assembly and casting.

Figure 5:
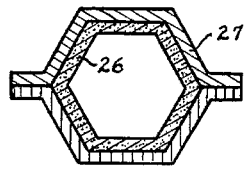
FIG. 5 is a schematic view showing in simplified sectional form an undersize shell core being formed by a preform core box.
Figure 6:
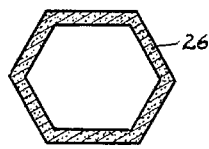
FIG. 6 is a schematic view showing in simplified sectional form an undersize shell core.
Figure 7:
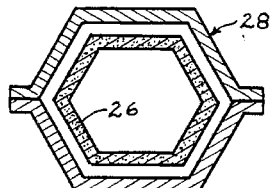
FIG. 7 is a schematic view showing in simplified sectional form an undersize shell core supported in a finish core die so as to define an investment cavity therebetween.
Figure 8:
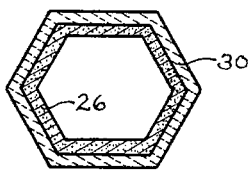
FIG. 8 is a schematic view showing in simplified sectional form an invested shell core.

In FIGS. 5 and 6, a sand shell core 26, is conventionally formed as described above, but in undersize configuration by preform core box 27. The undersize shell core 26 is then positioned in a finish plastic or metal core die 28 as shown in FIG. 7, being supported in spaced relation to the formative surface of the core die by suitably positioned projections or buttons, not shown. The shell core is then invested with a slurry of self-bonding refractory mix, using conventional investment molding techniques, so as to form a layer of investment 30 thereabout adhering to the exterior surface of the undersize shell as shown in FIG. 8. The invested shell core is removed from its die and either stored or subjected to a drying operation, prior to mold assembly.

Figure 4:
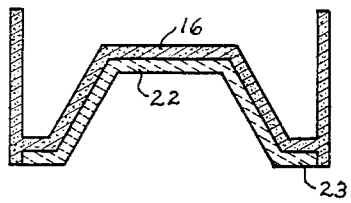
FIG. 4 is a schematic view showing in simplified sectional form an invested shell mold.
Figure 9:
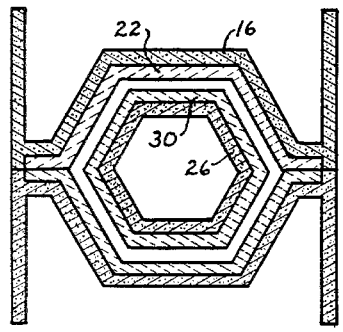
FIG. 9 is a schematic view showing in simplified sectional form a mold assembly having invested shell mold as cope and drag, and an invested shell core.

Referring now to FIG. 9, the invested shell core of FIG. 8 is located by suitable core prints, not shown, in identical invested shell molds of FIG. 4 which are in complementary registration as cope and drag in a mold assembly. It will be understood, of course, that identical cope and drag molds are illustrated to simplify an understanding of the invention and that in practice each may be of unique configuration.

The porous sand preform, that is, the undersize core or oversize mold, need not follow the detail configuration of the finish die but should provide for a substantially even thickness of investment so as to minimize stresses.

The shell core will normally be formed with three or more projections or buttons to support and locate the core within the core die. After investing the shell core and separating it from the core die, these buttons are normally ground down and covered with a small layer of self-bonding slurry mix so as to conform to the outer contour of the layer of investment.

A known gypsum investment yielding satisfactory results is as follows:

| Material | Percent by Weight | Mesh |
| --- | --- | --- |
| Cristobalite | 50 | 325 |
| Tridymite | 20 | 200 |
| Plaster of Paris | 30 | 100 |

Sufficient water added to the dry materials to obtain a proper working consistency. Prior to the addition of water, chopped strands of fiberglass were added to impart strength, and a retarder was added to delay setting for about 15 to 20 minutes. Typical values are .3% of fiberglass, .2% of sodate retarder, such as sodium citrate, and 50 parts of water per 100 parts of dry materials. For best all around results, however, I prefer to use a gypsum investment commercially available as PVC–243 manufactured by Pre-Vest, Inc. of Cleveland, Ohio.

In place of the particular materials referred to above, other suitable refractory materials such as zirconium silicate, sillimanite, alumina, malachite, or fused silica may be employed, having if desired different grain size and different proportions from those set forth above. The materials employed in any particular application will be selected in accordance with the form of the casting, the metal being cast and surface finish required. Similarly, other bonding agents may be used such as sodium silicate, cement, aqueous colloidal silica sol, ethyl silicate and the like.

The investment slurry penetrates the interstices of the porous sand shell creating a strong mechanical bond. The thickness of the layer of invetment on the sand shell is a function of the size and complexity of the final mold or core and the permeability required with a thickness in the range of $\frac{1}{64}$ inch to 1 inch being considered the practical limits. For best results, however, I prefer a uniform layer of between $\frac{1}{8}$ inch and $\frac{1}{2}$ inch.

The dry mix of shell sand is prepared by mixing a major portion of silica sand with a minor portion of thermosetting resin in powder form, usually on the order of 2 to 4% by weight depending on shell strength requirements. The sand which is preferably used to produce best results is a pure silica sand having an American Foundrymen's Society fineness number of between 30 and 150, with sands having AFS fineness numbers of between 40 and 60 being particularly satisfactory for most applications when used with a 3% minor portion of thermosetting resin. For thermosetting resin, I prefer to use a two-step phenol formaldehyde resin commonly termed phenolic resin. A suitable such resin is commercially available as Durez Resin No. 18123 manufactured by the Durez Plastics Division of the Hooker Chemical Corporation of North Tonawanda, New York. The baking operation results in conversion of the resinous material to a hard insoluble binder which securely binds the sand grains together. It has been found that after such conversion, the resin is completely insoluble to conventional investment binders such as plaster of Paris and water, aqueous colloidal silica sol, and ethyl silicate. It has been observed that the resin-bonded shell remains hard when subjected to temperatures up to a threshold of between 450 and 500 degrees F., where a carbonizing action begins to take place, accelerating with increased temperature, which eventually destroys the binding effect of the resin. It is essential, then, that the invested shell be maintained at such temperatures during the drying operation the accumulative effect of which will not substantially reduce or destroy the strength of the resin-bonded sand shell. I have obtained satisfactory results using oven drying temperatures in the range of 250 degrees F. to 425 degrees F., which range provides some allowance for temperature distribution irregularities and control tolerances in the oven.

The length of time the invested shell should be baked to remove moisture prior to casting must be empirically determined for each configuration and size of mold or core, as well as the thickness of investment thereon. In arriving at an optimum drying time the following generalizations may be applied. The lower the oven temperature and the thicker the investment, the longer baking or drying time necessary, with about 250 degrees F. being the minimum practical drying temperature. Twelve hours of drying time at 300 degrees F., was required using a quarter-inch-thick investment covering an area of about one square foot. Using an oven temperature of about 400 degrees F., with a similarly invested shell, it was found that about ten hours was sufficient for drying.

Figure 10:
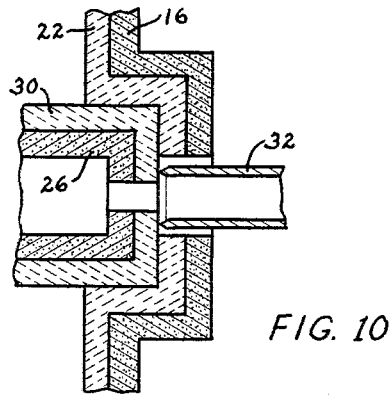
FIG. 10 is a simplified sectional view, partly broken away, showing application of vacuum to an invested shell core through the core print of a mold assembly.

The optimum temperature of each part of the mold assembly for receiving molten metal must be empirically determined for each configuration of casting and metal to be poured, and usually is taken as the final drying temperature. In arriving at the optimum temperature of the mold assembly for receiving molten metal, it will be recognized that the threshold of destruction temperature may be exceeded for a short time just prior to casting without a substantial loss in shell strength.

Where the mold assembly defines a casting cavity of relatively complex configuration, such as where the investment defines a bladed stator area, very superior results have been obtained by application of vacuum during casting. Depending on the configuration of the casting cavity, vacuum may be applied to the invested core, the invested mold, or both. To accomplish this, the invested sand core is normally drilled or otherwise formed with an opening, usually where the invested core is to be supported by a core print as in FIG. 10, for the application of vacuum during casting to draw off gases. Such reduction of the internal pressure during casting tends to draw in metal to the core, thereby permitting greater detail to be defined by the core surface. Application of vacuum may be achieved by inserting an elongate metal vacuum tube through the opening into the interior of the core, or by abutting the annular knife-like open end of a vacuum tube 32 to form a seal against the investment layer 30, as shown in FIG. 10, encompassing the opening which communicates with the interior of the core. This abutting relation of the vacuum tube makes its own seal and tends to hold itself in sealing position. In practice, however, the vacuum tube is normally mudded in as by wet $CO_2$ sand or core paste, to secure it in position. Vacuum tube 32 is normally turned slightly while in such abutting relation so as to seat properly against the investment. Vacuum may likewise be applied to invested shell molds as final preparation of mold prior to casting molten metal. This may be accomplished by provision of a vacuum plate 35 across the mold side walls as shown in FIG. 11, after sealing the mold walls as by disposing a tight flask thereabout, as at 36, or by applying a suitable sealant directly to the sand shell walls.

Figure 11:
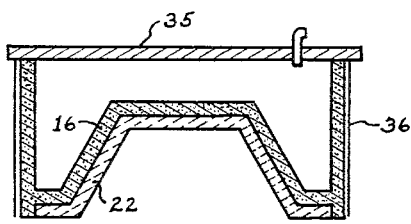
FIG. 11 is a schematic showing in simplified form the application of vacuum to an invested shell mold.
Figure 12:
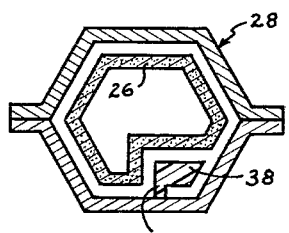
FIG. 12 is a schematic view showing in simplified sectional form an undersize shell positioned along with a loose piece or pattern in a finish core die prior to investing.

In an alternate form of the invention shown in FIGS. 11 and 12, one or more loose pieces or patterns, as at 38, may be positioned on supports or core prints, as at 39, in the finish core die 28 along with the undersize shell core, 26. The pattern 38 and shell core 26 are then invested with the slurry of self-bonding refractory mix 30, as described above. Depending on the shape of the loose pattern and the extent of its investment, it may fall away when the invested shell core is removed from the finish core die, or it may be removed by a suitable drawing operation. It will be recognized that the loose pattern may as well be associated with the oversize shell mold and invested therewith should such association permit its integral removal.

Where the shape of the pattern 38 is such that integral removal is not possible, it may be formed of a disposable or expendable material, such as low-melting metal alloy or non-water-soluble wax, and removed from the invested core or mold by melting. As with an integrally removable pattern, the loose disposable pattern is positioned on supports or core prints in the finish die along with the sand shell. The loose pattern and the sand shell are then invested with the slurry of refractory mix as described above, and after the investment has set the invested shell and pattern are subjected to a low-temperature pattern disposal process which will not damage the sand shell. A typical application for pattern 38 would be the turbine or vaned portion of a complex rotor or stator.

Investment casting waxes suitable for use as expendable pattern material are formulated by adding hard natural waxes such as carnauba or candelilla to a cheaper petroleum wax base. Shellac and various natural or synthetic resins, as well as heavy metal soaps and fatty acid amides are also used as hardening agents in such formulations. The wax utilized should be non-soluble in water or steam and have a melting point below that of steam at 212 degrees F. A suitable known wax, having a melting point of about 130 degrees F., may be prepared by melting together a mixture as follows.

| | Percent (by wt.) |
|---|---|
| American gum rosin WW grade | 55 |
| Paraffin wax | 30 |
| Candelilla wax | 10 |
| Carnauba wax | 5 |

For best all-around applicability, however, I prefer a blend of waxes and resins commercially available as Zyrox 3014 manufactured by the Koppers Company, Tar Products Division, Pittsburgh, Pa., which has a melting point of between 162 and 185 degrees F. Whichever wax is chosen, it will be recognized that the maximum temperature utilized in the disposing process must be below the destruction temperature of the sand shell.

In a pattern disposal method found suitable for gypsum investments, the invested sand shell is suspended in a wet steam atmosphere at atmospheric pressure in such an attitude that the melted wax flows from all sections of the casting cavity in the ceramic form. The steam penetrates the permeable investment, melting the wax so as to leave the interior free from residue. Because the wax is not soluble in water, no wax is absorbed in the interstices of the investment by capillary action. However, where more than about 1 hour expires between the setting up of the investment and the steam dewaxing operation, it is advisable to soak the invested shell in water to saturate the investment so as to prevent wax absorbtion during dewaxing. Where the pattern is of relatively complex configuration, best results were obtained by flushing out the invested shell with hot water immediately after the steam dewaxing operation. The invested shell is then suspended in hot vapors of trichlorethylene to remove any traces of silicone release agents, wax, or other residual impurities in the casting cavity. A trichlorethylene degreasing plant of the common type, operated at about 250 degrees F., is well adapted for this operation.

The length of time needed for the dewaxing and degreasing operations must be empirically determined for each configuration and size of mold and core, as well as the thickness of the investment thereon. In general, larger disposable patterns will require longer dewaxing and degreasing times. It has been found that 15 to 20 minutes in each of the dewaxing and degreasing operations is satisfactory for a complex pattern configuration of approximately 40 square inches in area with investment layer about ¼″ thick all around. The soaking period discussed above, is, in addition, a function of the time expiring between setting of the investment and dewaxing. About a fifteen minute soaking period has been found satisfactory for the example presented above where three hours expired before dewaxing.

This method of low temperature pattern disposal has also been found satisfactory for a low melting point alloy known commercially as Cerrolow 117, manufactured by the Cerro Corporation of New York, N. Y. Cerrolow 117 contains 44.7% bismuth, 22.6% lead, 8.3% tin, 5.3% cadmium, and 19.1% indium, and has a melting point of 117 degrees F. For best results it was necessary, however, to blow out or flush out the casting cavity with air under pressure prior to degreasing to remove traces of dross residue. It is contemplated that any other metal alloy having a melting point below the steam temperature and above, say 110 degrees F. would be suitable as a disposable pattern material in the above described disposing process, providing its other physical characteristics, such as expansion characteristic, were compatible with the investment utilized.

It will be readily apparent to those skilled in the art that, depending on accuracy and finish requirements of the casting, invested sand shell cores may be used with conventional molds, such as those produced by the shell molding or $CO_2$ processes, or invested shell molds may be used with conventional cores, either solid or shell.

Figure 14:
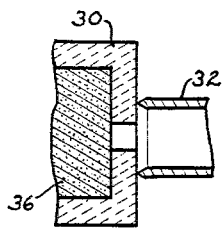
FIG. 14 is a simplified sectional view, partly broken away, showing application of vacuum to an invested solid core.
Figure 13:
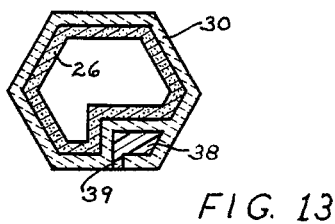
FIG. 13 is a schematic view showing in simplified form an invested shell core and loose piece or pattern.

While the invention has been described with the use of shell-type-premolds as the preferred embodiment, I have found that in limited applications, as where relatively small molds or cores are to be formed, solid porous sand premolds may be used to advantage, and may utilize other insoluble binders such as furan-type resins. As shown in FIG. 14, vacuum may as readily be applied to an invested solid core 36 by vacuum tube 25. Since the permeability of the porous sand is substantially greater than that of the investment, the effect of the vacuum is distributed evenly, drawing from all investment surfaces.

Conventional gating and risering techniques can be applied to modify the cores and molds shown to provide for investing and casting. The type, size and location of gates and risers provided would depend on the configuration of the mold cavity and the preferred methods of handling the slurry mix and molten metal.

It will further be understood that the term "molding" as used herein, is generally applied to the forming of both cores and molds, whereas, the terms "mold" and "core" are used in a specific sense. It is also intended that the term "mold assembly" comprehend an assembly of a mold with one or more cores.

From the foregoing it should be apparent that I have provided a new and improved investment molding method which is well adapted to fulfill the aforestated objects of the invention. Moreover, whereas the invention has been described in particularity with respect to a preferred embodiment which gives satisfactory results, it will be understood by those skilled in the art to which the invention most nearly appertains that other embodiments and modifications thereof may be resorted to without departing from the spirit or scope of the invention as defined by the appended claims.

I claim:

1. A method of investment molding including the steps of, forming a porous sand premold having an insoluble resin binder, associating said premold with a finish die so as to define an investment cavity therebetween, supporting a low melting loose piece in said cavity spaced from said premold and die, disposing a slurry of self-bonding refractory mix having a plaster of Paris binder in said cavity, allowing the refractory mix to set so as to form a layer of investment adhering to said premold, separating the invested premold from the finish die, separating the loose piece from the invested premold, and drying the resulting invested premold at a temperature below the destruction temperature of said premold.

2. A method of investment molding including the steps of, forming a porous sand shell having an insoluble resin binder, associating said sand shell with a finish die so as to define an investment cavity therebetween, supporting a low melting loose piece in said cavity spaced from said sand shell and die, disposing a slurry of self-bonding refractory mix having a plaster of Paris binder in said cavity, allowing the refractory to set so as to form a layer of investment adhering to said sand shell, separating the invested sand shell from the die, separating the loose piece from the invested sand shell, and drying the resulting invested sand shell at a temperature below the destruction temperature of the sand shell.

3. A method of investment molding including the steps of, forming a sand shell having an insoluble resin binder, associating the sand shell with a finish die so as to define an investment cavity therebetween, supporting a low melting loose-piece in said investment cavity, disposing a slurry of refractory mix having a plaster of Paris binder into said investment cavity, allowing the investment to set so as to form a layer of investment adhering to the sand shell, separating the invested shell and low-melting piece from the die, subjecting the invested shell and low-melting piece to wet steam for a sufficient time to melt out the low-melting piece, subjecting the invested shell to hot vapors of trichorethylene to dissolve foreign residue from the casting cavity, and drying the invested shell below the destruction temperature of the sand shell portion thereof.

4. In an investment molding process utilizing a porous sand preform core invested with a finish layer of highly comminuted refractory mix, the steps of forming an opening through the finish layer, securing the open end of a vacuum tube at said opening so as to seal with the finish layer, placing said core within a mold, applying vacuum to said tube, and pouring molten metal into said mold against said core, whereby resultant gases are uniformly drawn from said finish layer through the porous sand core.

5. A method of investment molding for obtaining a casting of high dimensional accuracy throughout, including the steps of, forming an undersize sand shell core having an insoluble resin binder, placing said sand shell core in a finish core die so as to be in spaced relation with the formative surfaces of the core die, disposing a slurry of self-bonding highly-comminuted refractory mix having a plaster of Paris binder between said sand shell core and core die so as to form a layer of investment adhering to said sand shell, forming an oversize sand shell mold having an insoluble resin binder, supporting said sand shell mold in a finish mold die so as to be spaced relation with the formative surfaces thereof, disposing a slurry of self-bonding highly-comminuted refractory mix having a plaster of Paris binder between said sand shell mold and said mold die so as to form a layer of investment therebetween adhering to said shell mold, said invested mold and core being adapted for registration so as to define a casting cavity therebetween upon assembly, separating the resulting invested shell mold and invested shell core from their respective dies, drying the invested sand shell mold and core at a temperature below the destruction temperature of the sand shells, and forming an opening through said invested sand shell core and mold communicating with the interior of the invested core for the application of vacuum to such opening during casting so as to maintain the interior of the invested core at a reduced pressure.

6. A method of investment molding including the steps of, forming an undersize sand shell core having an insoluble resin binder, placing the sand shell core in a finish core die so as to be in spaced relation with the formative surfaces of the die, disposing a slurry of self-bonding highly comminuted refractory mix having a plaster of Paris binder between said sand shell core and the formative surfaces of the core die so as to form a layer of investment therebetween adhering to the sand shell core, separating the invested core from the die, drying the invested core at a temperature below the destruction temperature of the sand shell core, and forming an opening in the invested shell core communicating with the interior thereof for the application of vacuum during casting.

References Cited by the Examiner

UNITED STATES PATENTS

| | | | |
|---|---|---|---|
| 758,590 | 5/30 | Gilderman | 22—194 |
| 2,328,357 | 8/43 | Petersen | 22—194 |
| 2,434,780 | 1/48 | Wiss et al. | 22—193 |
| 2,815,552 | 12/57 | Turnbull et al. | 22—196 |
| 2,820,268 | 1/58 | Kohl | 22—193 |
| 2,841,844 | 7/58 | Ansign et al. | 22—193 |
| 2,931,081 | 4/60 | Dunlop | 22—193.5 |
| 2,976,588 | 3/61 | Anaala et al. | 22—193.5 |
| 3,010,166 | 11/61 | Skoning | 22—193 |

MARCUS U. LYONS, *Primary Examiner.*

WILLIAM J. STEPHENSON, *Examiner.*